(12) United States Patent
Wüst

(10) Patent No.: US 11,141,792 B2
(45) Date of Patent: Oct. 12, 2021

(54) MODULARLY CONSTRUCTED SLM OR SLS PROCESSING MACHINE

(71) Applicant: TRUMPF Laser—und Systemtechnik GmbH, Ditzingen (DE)

(72) Inventor: Frank Peter Wüst, Ditzingen (DE)

(73) Assignee: TRUMPF Laser—und Systemtechnik GmbH, Ditzingen (DE)

( * ) Notice: Subject to any disclaimer, the term of this patent is extended or adjusted under 35 U.S.C. 154(b) by 592 days.

(21) Appl. No.: 15/642,687

(22) Filed: Jul. 6, 2017

(65) Prior Publication Data

US 2017/0305140 A1 Oct. 26, 2017

Related U.S. Application Data

(63) Continuation of application No. PCT/EP2015/080072, filed on Dec. 16, 2015.

(30) Foreign Application Priority Data

Jan. 8, 2015 (DE) .......................... 102015200134.2

(51) Int. Cl.
*B29C 64/25* (2017.01)
*B29C 64/277* (2017.01)
(Continued)

(52) U.S. Cl.
CPC ............ *B22F 12/00* (2021.01); *B29C 64/153* (2017.08); *B29C 64/25* (2017.08); *B29C 64/268* (2017.08);
(Continued)

(58) Field of Classification Search
CPC ......... B33Y 50/02; B33Y 30/00; B33Y 40/00; B29C 64/386; B29C 64/35; B29C 64/20;
(Continued)

(56) References Cited

U.S. PATENT DOCUMENTS 9,114,478 B2* 8/2015 Scott ..................... B23K 26/046
9,849,543 B2* 12/2017 Scott ....................... B33Y 30/00
(Continued)

FOREIGN PATENT DOCUMENTS

DE 102005014483 A1 10/2006
DE 202006016477 U1 12/2006
(Continued)

OTHER PUBLICATIONS

English translation of DE 102009036153 (Year: 2011).*
(Continued)

*Primary Examiner* — Joseph S Del Sole
*Assistant Examiner* — Baileigh Kate Darnell
(74) *Attorney, Agent, or Firm* — Fish & Richardson P.C.

(57) ABSTRACT

A processing machine includes a plurality of radiating modules disposed in a row, and a process chamber module configured to releasably attach to the plurality of radiating modules. The process chamber module includes a process chamber defining a processing field, a construction platform, a powder coater, and a powder reservoir. The powder coater is configured to apply a powder material layer-by-layer in a direction of the construction platform within the processing field. The powder reservoir is configured to infeed the powder material to the powder coater. Each radiating module includes a respective energy beam source configured to generate an energy beam, and a respective beam guide configured to guide the energy beam in a direction of the construction platform within a portion of the processing field. The portions of the processing field of two adjacent radiating modules partially overlap.

21 Claims, 4 Drawing Sheets

(51) Int. Cl.
| | |
|---|---|
| *B33Y 30/00* | (2015.01) |
| *B22F 12/00* | (2021.01) |
| *B33Y 40/00* | (2020.01) |
| *B29C 64/153* | (2017.01) |
| *B29C 64/35* | (2017.01) |
| *B29C 64/386* | (2017.01) |
| *B29C 64/268* | (2017.01) |
| *B33Y 50/02* | (2015.01) |
| *B22F 10/10* | (2021.01) |

(52) U.S. Cl.
CPC ............ *B29C 64/277* (2017.08); *B29C 64/35* (2017.08); *B29C 64/386* (2017.08); *B33Y 30/00* (2014.12); *B33Y 40/00* (2014.12); *B33Y 50/02* (2014.12); *B22F 10/10* (2021.01); *Y02P 10/25* (2015.11)

(58) Field of Classification Search
CPC ..... B29C 64/153; B29C 64/25; B29C 64/268; B29C 64/277; B22F 3/1055; B22F 2003/1059; B22F 2003/1056; B22F 12/00

See application file for complete search history.

(56) References Cited

U.S. PATENT DOCUMENTS

| | | | |
|---|---|---|---|
| 2011/0259862 A1* | 10/2011 | Scott | B23K 26/082 219/121.73 |
| 2012/0052145 A1* | 3/2012 | Chen | B08B 5/02 425/217 |
| 2013/0112672 A1 | 5/2013 | Keremes et al. | |
| 2015/0352668 A1* | 12/2015 | Scott | B23K 35/0244 219/76.1 |
| 2016/0279707 A1* | 9/2016 | Mattes | B29C 64/277 |

FOREIGN PATENT DOCUMENTS

| | | |
|---|---|---|
| DE | 102009036153 A1 | 2/2011 |
| WO | WO2004014636 A1 | 2/2004 |
| WO | WO2010026397 A1 | 3/2010 |
| WO | WO2014165735 A1 | 10/2014 |
| WO | WO2014199134 A1 | 12/2014 |

OTHER PUBLICATIONS

International Search Reporting for corresponding PCT Application No. PCT/EP2015/080072, dated Mar. 2, 2016, 4 pages.

Notification of Transmittal of Translation of the International Preliminary Report on Patentability for PCT Application No. PCT/EP2015/080072, dated Jul. 20, 2017, 12 pages.

* cited by examiner

MODULARLY CONSTRUCTED SLM OR SLS PROCESSING MACHINE

CROSS-REFERENCE TO RELATED APPLICATIONS

This application is a continuation of and claims priority under 35 U.S.C. § 120 to PCT Application No. PCT/EP2015/080072 filed on Dec. 16, 2015, which claims priority to German Application No. 10 2015 200 134.2, filed on Jan. 8, 2015. The entire contents of these priority applications are incorporated herein by reference.

TECHNICAL FIELD

The present disclosure relates to a processing machine for producing components by way of a layer-by-layer construction from material powder and of a layer-by-layer solidification of the material powder by at least one energy beam, and to a modular system for assembling such a processing machine.

BACKGROUND

A processing machine for selectively laser sintering or selectively laser melting a material powder (e.g., prototyping/adaptive laser manufacturing equipment) is described in WO 2010/026397 A1.

Selective laser sintering (SLS) and selective laser melting (SLM) are generative layer-by-layer construction methods in which a component is constructed layer-by-layer by sintering or melting a material powder by means of a laser beam. The material powder is applied all-over to a construction platform, and the layers are sintered or melted step-by-step into the powder bed by actuating the laser beam according to the layered contour of the component. The construction platform is subsequently lowered by the amount of a layer thickness, and powder is applied from anew. This cycle is repeated until all layers of the component have been sintered or applied by melting, respectively.

The selective laser melting (SLM) or selective laser sintering (SLS) laser processing machine described in WO 2010/026397 A1 includes an optical module which has the beam guide for a laser beam, and a molding part which has the powder-conducting elements such as the process chamber.

Furthermore, an SLM or SLS laser processing machine having a plurality of lasers, the laser beams of the latter covering different processing part-fields on the construction platform that by way of the field boundaries thereof mutually overlap, is described in DE 10 2005 014 483 A1. However, this laser processing machine does not permit a rapid changeover in terms of the material powder, for example from plastics-material powder to metal or ceramics powder; to this end, prior thereto all powder-conducting elements have to be cleaned in a complex manner.

SUMMARY

It is the object of the present disclosure to increase the flexibility in terms of the processing field of said processing machine.

This object can be achieved by a processing machine having the features of claim 1.

According to the subject matter of the present disclosure, SLM or SLS processing machines of different sizes can be flexibly produced by way of a few process chamber and radiating modules. The processing machine can be scaled in a very simple manner by way of such a modular machine concept. The process chamber can jointly with the powder-conducting elements (coater/powder management) be constructed in various sizes, while the radiating modules have a standard size and can be lined up beside one another with other radiating modules, so as to be able to receive a process chamber module having a larger process chamber. The controller of one of the radiating modules herein becomes the master controller in terms of the controllers of the other radiating modules.

The width of the construction platform of the process chamber module preferably corresponds to approximately the width of the processing fields of the plurality of radiating modules.

One of the plurality of radiating modules is preferably operated as a master module, and each of the other radiating modules is operated as a slave module that is controlled by the master module. The radiating modules that are lined up beside one another, in terms of control technology, are interconnected in the manner of a master/slave concept and are optically inter-referenced in order for the processing field to be distributed among the individual processing part-fields. Each radiating module herein advantageously has a controller interface for connecting to a controller interface of another radiating module that is lined up. This controller interface can be a wireless interface or an electronic machine interface which is disposed on either side on a radiating module, so as to connect to the machine interface of an adjacent radiating module.

One or some of the radiating modules, in particular all radiating modules, advantageously have at least one optical sensor, in particular a camera, the detection range of said optical sensor being configured for detecting at least part of a processing field of an adjacent radiating module. For example, the master module by means of the energy beam thereof can carry out a processing procedure or illuminate fixed calibration points which in turn are detected by the camera of the adjacent first slave module, the latter thus calibrating its own positioning in relation to the master module. The next slave module can thus be calibrated in relation to an already calibrated slave module and so forth until all slave modules have been calibrated in relation to the master module.

One or some of the radiating modules, in the case of a plurality of radiating modules, in particular the outer radiating modules, or the process chamber module, particularly preferably have referencing aids, in particular side plates or referencing bolts, for assembling the processing machine. For example, in the case of a single radiating module, the process chamber module can be disposed between two locating aids of the radiating module, or in the case of a plurality of radiating modules that are disposed beside one another, the process chamber module can be disposed between two referencing aids of the two outer radiating modules, said referencing aids being provided on the end sides. Each radiating module on either side advantageously has an interface for releasably fastening the side plates. Alternatively, the process chamber module can also have side plates between which the one radiating module or the plurality of radiating modules is/are disposed.

In the case of particularly preferred embodiments, the process chamber module during the production of the component is connected to supply sources (power, water, gas, data) and to the controller of the (master) radiating module exclusively by way of the at least one radiating module. The complete supply to the process chamber module is ensured by way of the radiating module or modules, and the (master) radiating module not only controls/regulates the energy beam source(s) and the beam guide(s) but also the coater and the powder management of the process chamber. Once the production of the components has been terminated, the process chamber module can also be connected to external supply stations which deliver power/water, for example, so as to permit slow/regulated cooling or to deliver gas so as to generate a positive protective gas pressure in the retrieval of the component, said positive protective gas pressure permitting retrieval without the powder being exposed to a significant concentration of atmospheric gases. It is possible for controlling/regulating of these processes to be performed by a controller of the process chamber module, but the external supply stations preferably have a controller for such tasks.

The process chamber of the process chamber module is advantageously embodied as a self-contained chamber having a process chamber window, in particular as a chamber which is evacuatable or is substantially relievable of reactive gases by purging with an inert gas, the at least one energy beam being capable of being coupled into the process chamber through said process chamber window.

The process chamber module and/or the at least one radiating module can be mounted so as to be mobile, for example on rollers, in order for said modules to be able to be moved together to form the laser processing machine in an easy and simple manner.

The energy beam source is particularly preferably configured as a laser for generating a laser beam, and the beam guide is configured as a deflection unit for deflecting the laser beam in a two-dimensional manner. Alternatively, the energy beam source can also be embodied as an electron beam source, the electron beam of which being deflected onto the powder bed.

In the assembly (docking) of the powder chamber module, the radiating module is informed by a management system as to which component is to be produced. The radiating module disposes of a controller which controls the energy beam (output, orientation, focus, etc.) and at least the powder coating and the lowering of the construction platform. The radiating module when being docked optionally recognizes the process chamber module by way of a unique identifier (via an exchange of data, input of an operator, scanning of a barcode/QR code on the process chamber module), said radiating module demanding the production job envisaged for the process chamber module from the management system. The controller of the radiating module can optionally also control a powder pre-heater/component cooler, the powder preparation and/or conveyance, etc.

The process chamber of the process chamber module is preferably embodied so as to be gas-tight and to have a gas inlet and a gas outlet so as to be able to evacuate the process chamber or to purge the latter with an inert gas.

The process chamber module preferably has at least one screen that is inclined at an angle in relation to the horizontal, and at least one collection container that is disposed below the at least one screen in such a manner that material powder that is not capable of being screened moves in a manner aided by gravity along the at least one screen and is collectable in the at least one collection container. The at least one screen is advantageously mounted so as to be mechanically movable and by way of a drive driven so as to move in an oscillating manner.

The process chamber module furthermore preferably has a self-contained powder circuit which includes the at least one screen and at least one conveying section for infeeding the material powder that has been screened by the at least one screen into the powder reservoir.

The process chamber module can furthermore have detection means, in particular a balance, for detecting the powder quantity in the powder reservoir, and at least one closable powder inlet for infeeding powder in a metered manner into the powder reservoir or into the powder circuit. For example, a cartridge with powder can be connected to the powder inlet. In particular, the detection means weighs the powder remaining in the powder reservoir/powder circuit following the production of a component, and opens the powder inlet on demand.

The construction platform is particularly preferably embodied so as to be separable in a gas-tight manner from other elements of the powder circuit.

The subject matter of the present disclosure also relates to a modular system for assembling a processing machine as is configured above, having a plurality of process chamber modules of different widths, and having a plurality of radiating modules, wherein the width of the process chamber modules in each case corresponds to the overall width of at least some radiating modules that are disposed in a row beside one another. The radiating modules are preferably of identical construction, that is to say embodied so as to be of identical width.

Further advantages can be derived from the claims, from the description, and from the drawing. Likewise, the features mentioned above and hereunder can be used individually or in any arbitrary combination with one another. The embodiments shown and described are not to be understood as an exhaustive enumeration but rather have an exemplary character in order for the invention to be narrated.

DETAILED DESCRIPTION

In the description of the figures hereunder, the same reference signs are used for the same or functionally equivalent components, respectively.

Figure 1:
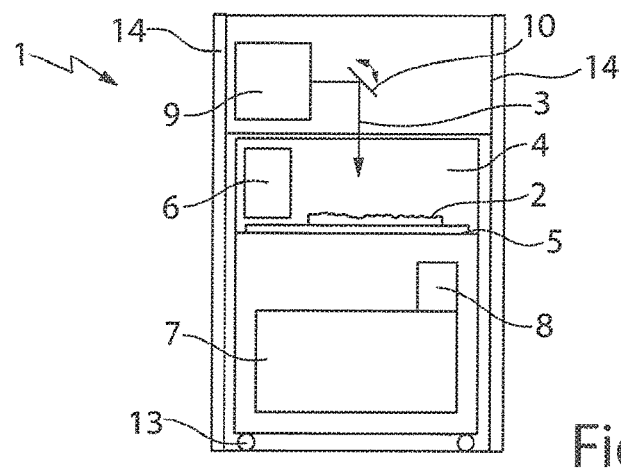
FIG. 1 is a schematic illustrating an example of an SLS or SLM laser processing machine.

The SLS or SLM laser processing machine 1 shown in FIG. 1 serves for producing components by way of a layer-by-layer construction from a material powder 2 and for the layer-by-layer sintering or melting of the material powder 2 by means of at least one laser beam 3.

The laser processing machine 1 in a manner known includes powder-conducting elements such as, for example, a process chamber 4 having a construction platform 5 and having a powder coater 6 for the layer-by-layer application of a material powder 2 to the construction platform 5, and a powder reservoir 7 for the material powder 2 that is to be infed to the powder coater, and a powder recovery/preparation 8, as well as non-powder-conducting elements such as, for example, a laser 9 for generating the one laser beam 3, and a deflection unit 10 for aligning the laser beam 3 in a two-dimensional manner to the material powder 2 that is applied to the construction platform 5. The laser 9 and the deflection unit 10 are disposed above the process chamber 4.

In the laser processing machine 1, a component is constructed layer-by-layer by sintering or melting the material powder 2 by means of the laser beam 3. The material powder 2 is applied all-over to the construction platform 5 by the powder coater 6, and the layers are sintered or melted step-by-step into the powder bed by actuating the laser beam 3 according to the layered contour of the component. The construction platform 5 is subsequently lowered by the amount of a layer thickness, and the material powder 2 is applied from anew. This cycle is repeated until all layers of the component have been sintered or applied by melting, respectively.

Figure 2:
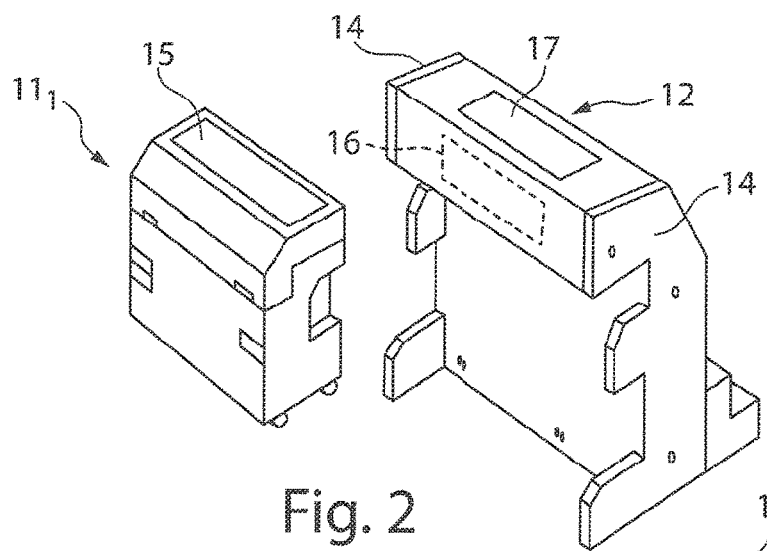
FIG. 2 is a schematic illustrating an example of a process chamber module and a radiating module from which the laser processing machine of FIG. 1 is releasably assembled.
Figure 3A:
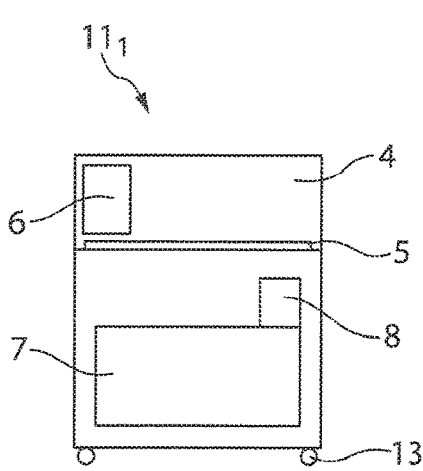
FIGS. 3A and 3B are schematics illustrating the process chamber module (FIG. 3A) and the radiating module (FIG. 3B) of the laser processing machine of FIG. 1.
Figure 3B:
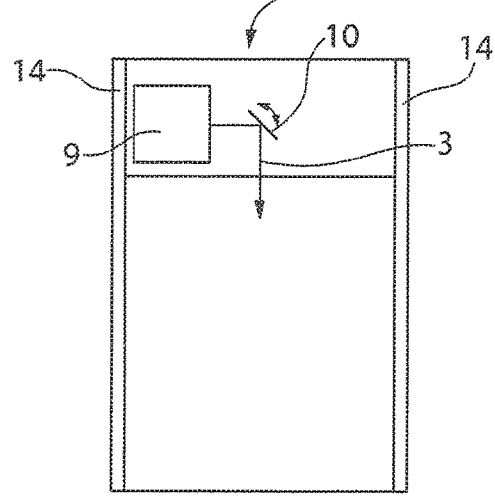

As is shown in FIG. 2, the laser processing machine 1 is releasably assembled from a process chamber module 11$_1$ and from a radiating module 12, wherein the process chamber module 11$_1$ shown in FIG. 3A includes all powder-conducting elements, that is to say presently the process chamber 4, the construction platform 5, the powder coater 6, the powder reservoir 7, and the powder recovery/preparation 8, and the radiating module 12 shown in FIG. 3B includes the non-powder-conducting elements, that is to say presently the laser 9 and the deflection unit 10. The radiating module 12 is preferably embodied so as to be stationary, while the process chamber module 11$_1$ is mounted so as to be displaceable on rollers 13. Two side plates 14 between which the process chamber module 11$_1$ can be plug-fitted to an exact fit are fastened to either side on the radiating module 12. The laser beam 3 that exits in a downward manner from the radiating module 12 is coupled into the process chamber 4 by way of a process chamber window 15 on the upper side. The supply of the process chamber module 11$_1$ with power, water, controller data, etc., is performed exclusively by way of the radiating module 12, wherein the connectors and interfaces required to this end on the process chamber module 11$_1$ and on the radiating module 12 are not shown. The process chamber module 11$_1$ per se does not have any dedicated controller for the production of components but is connected to the controller 16 of the radiating module 12. The radiating module 12 thus controls/regulates not only the laser 9 and the deflection unit 10 but also the powder management in the process chamber 4. Furthermore, an external display/operator panel 17 is attached to the radiation module 12.

Figure 4:
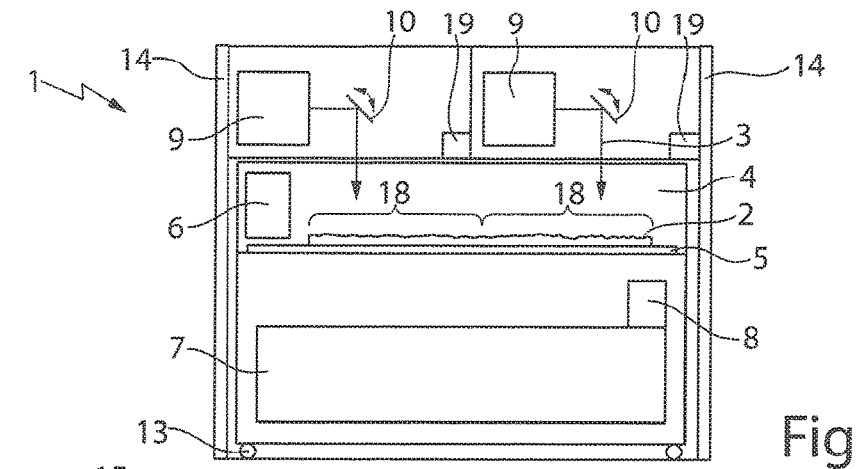
FIG. 4 is a schematic illustrating an example of a SLS or SLM laser processing machine.
Figure 5:
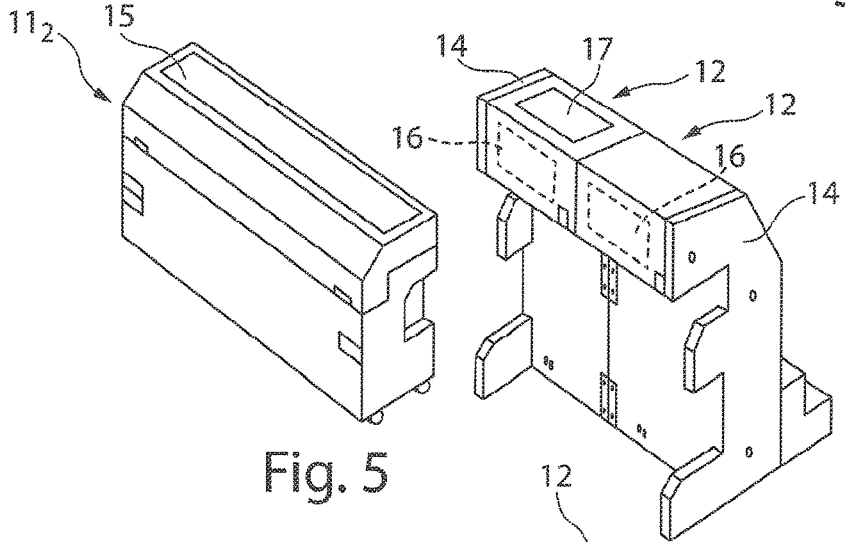
FIG. 5 is schematic illustrating an example of a process chamber module and two radiating modules from which the laser processing machine in FIG. 4 is releasably assembled.
Figures 6A, 6B:
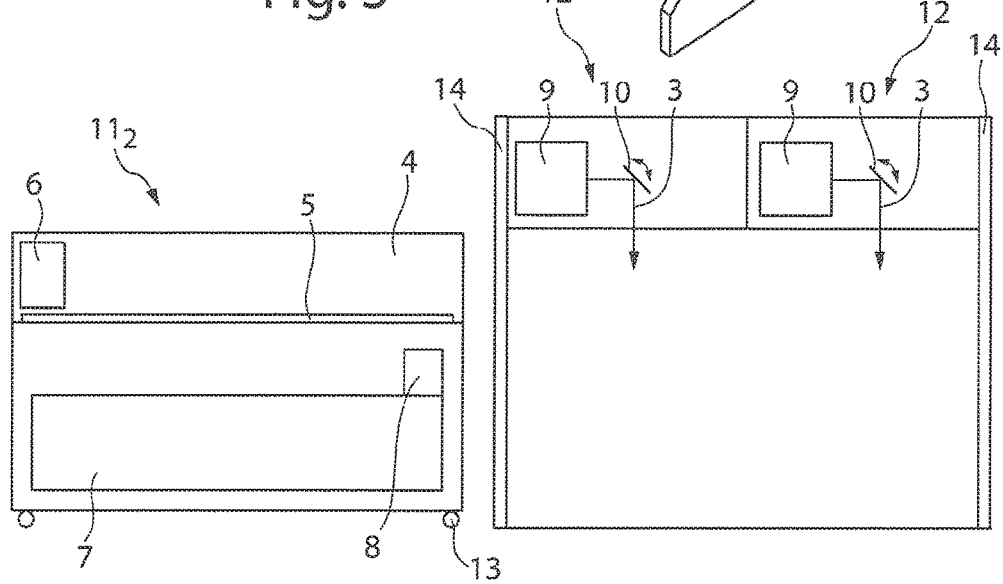
FIGS. 6A and 6B are schematics illustrating examples of the process chamber module (FIG. 6A) and the radiating modules (FIG. 6B) of the laser processing machine of FIG. 4.

Another laser processing machine 1 which is releasably assembled from a process chamber module 11$_2$ and two radiating modules 12 is shown in FIG. 4. The radiating modules 12 are of identical construction to the radiating module 12 of FIGS. 1 to 3A and 3B, while the process chamber module 11$_2$ is embodied so as to be double the width of the process chamber module 11$_1$ of FIGS. 1 to 3A and 3B. The two radiating modules 12 are fastened to one another in a side-by-side manner, and on the end side each have two side plates 14 between which the process chamber module 11$_2$ is plug-fitted to an exact fit. The two radiating modules 12, in terms of control technology, are connected in the manner of a master/slave concept and are optically inter-referenced in order for the processing field of the process chamber 4 to be distributed among mutually overlapping processing part-fields 18 of the two laser beams 3 of the radiating modules 12.

Each radiating module 12 has a controller interface (not shown) for connecting to the controller interface of the other radiating module, so as to interconnect the controllers 16 of the two radiating modules 12. For example, the controller interface can be a wireless interface or an electronic machine interface which is disposed on either side on a radiating module 12, so as to connect to the machine interface of an adjacent radiating module 12. The one radiating module 12 is operated as the master module, and the other radiating module 12 is operated as a slave module that is controlled by the master module.

The two radiating modules 12 each have one optical sensor 19 (for example a camera), the detection range of said optical sensor 19 being configured for detecting at least part of the processing part-field 18 of the respective other radiating module. For example, the master radiating module 12 by means of the laser beam 3 thereof can thus carry out a processing procedure or illuminate fixed calibration points which in turn are detected by the sensor 19 of the adjacent slave radiating module 12, the latter thus calibrating its own positioning in relation to the master radiating module. In the case of further radiation modules that are lined up beside one another, the next slave radiating module can then be calibrated in relation to an already calibrated slave radiating module and so forth until all slave radiating modules have been calibrated in relation to the master radiating module.

The supply of the process chamber module 11$_2$ with power, water, controller data, etc., is performed exclusively by way of the radiating modules 12, wherein the connectors and interfaces required to this end on the process chamber module 11$_2$ and on the radiating modules 12 are not shown in the drawing. The process chamber module 11$_2$ per se does not have any dedicated controller but is connected to the master controller 16 of the master radiating module 12. The master controller 16 thus controls/regulates not only the laser 9 and the deflection units 10 of the two radiating modules 12 but also the powder management in the process chamber 4. Furthermore, the external display/operator panel 17 which is used for both radiating modules 12 is attached to the radiating modules 12.

Figure 7:
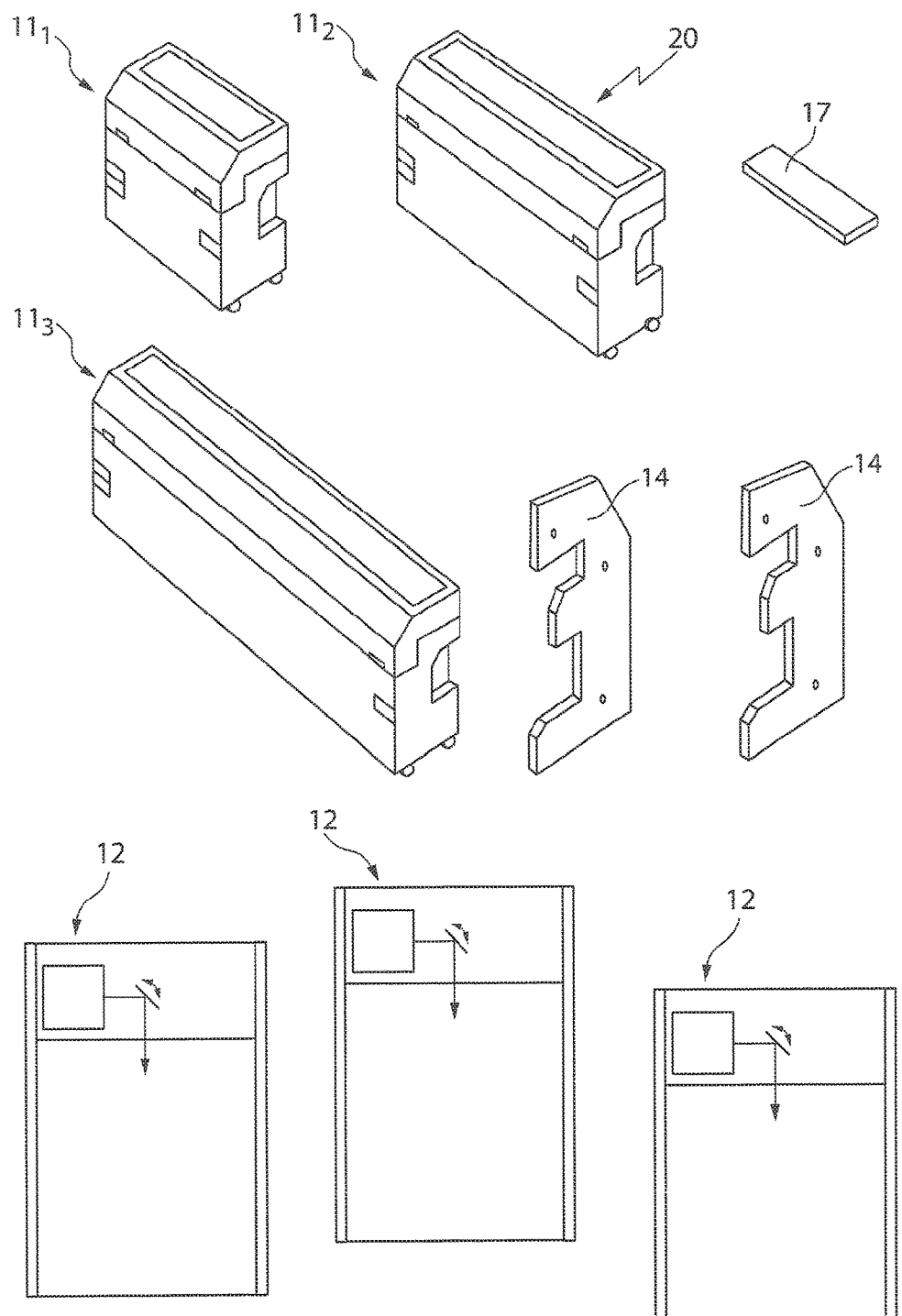
FIG. 7 is a schematic illustrating an example of a modular system for assembling laser processing machines.

FIG. 7 shows a modular system 20 for assembling laser processing machines 1, said modular system 20 being composed of a plurality of process chamber modules 11$_1$, 11$_2$, 11$_3$ of different widths, and from a plurality of radiating modules 12 of identical construction. The width of the process chamber module 11$_1$ herein corresponds to the width of a radiating module 12, the width of the process chamber module 11$_2$ corresponds to the width of two radiating modules 12, and the width of the process chamber module 11$_3$ corresponds to the width of n (n≥3) radiating modules 12. Moreover, the modular system 20 also has at least two side plates 14 and at least one external display/operator panel 17. Depending on the desired size of the process chamber, the respective process chamber module 11$_1$, 11$_2$, 11$_3$ is selected, and the respective number of radiating modules 12 are lined up beside one another. In the lining up of the radiating modules 12, the controller 16 of each further connected radiating module 12 follows the controller 16 of the first radiating module 12, the latter thus defining the master module.

Figure 8:
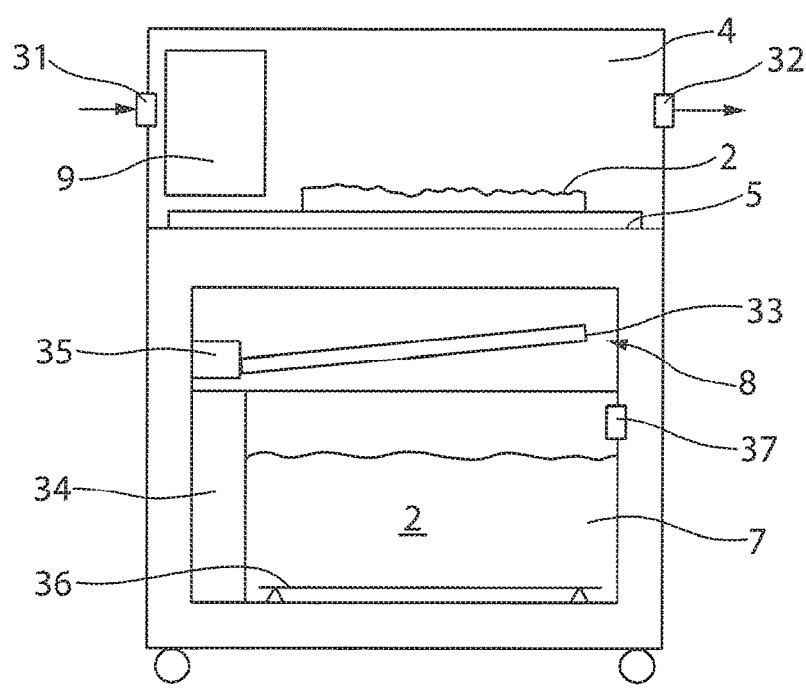
FIG. 8 is a schematic illustrating an example of a process chamber and of a powder recovery/preparation of the process chamber module.

As is shown in FIG. 8, the process chamber 4 of the process chamber modules $11_1$ to $11_3$, with the exception of a gas inlet 31 and a gas outlet 32, can be embodied so as to be gas-tight, so as to be able to evacuate the process chamber 4 or to purge the process chamber 4 with an inert gas.

Furthermore, a screen 33 is provided that is inclined at an angle in relation to the horizontal and a collection container 34 is provided that is disposed below the at least one screen 33 in such a manner that material powder 2 that is not capable of being screened moves in a manner aided by gravity along the one screen 33 and is collectable in the collection container 34. The screen 33 is advantageously driven by a drive 35 so as to move in an oscillating manner. The material powder 2 in the process chamber module is conducted in a self-contained powder circuit which includes the at least one screen 33 and at least one conveying section (not shown) for infeeding the material powder 2 that has been screened by the at least one screen 33 into the powder reservoir 7. The construction platform 5 is preferably embodied so as to be separable in a gas-tight manner from other elements of the powder circuit.

The powder reservoir 7 furthermore includes detection means 36, for example a balance, for detecting the quantity of powder, and a closable powder inlet 37 for infeeding powder in a metered manner into the powder reservoir 7 or into the powder circuit. For example, a cartridge with a material powder 2 can be connected to the powder inlet 37. The detection means 36 weighs the material powder 2 remaining in the powder reservoir 7 or powder circuit, respectively, following the production of a component, and opens the powder inlet 37 on demand.

Moreover, supply stations (not shown) to which the process chamber module $11_1$ to $11_3$ can be connected and which, like the radiating module 12, have a power, water, gas, and/or data connector, can be provided. Powder preheating/component cooling can be carried out with power in a regulated manner by the process chamber 4; water can likewise be used for the cooling of components or for cooling other elements of the process chamber. This function can be performed either by a simple controller in the process chamber 4 or by controlling the supply station via a data connector. The gas connector can provide a protective gas atmosphere in the process chamber 4, for example when the component is to be retrieved.

Whether controllers required for the process chamber modules are accommodated in this module or in the radiating modules and supply stations depends in particular on whether the radiating modules are rather used in a docked manner as a master and slave, or rather used individually. However, there will usually be more process chamber modules than radiating modules, since the process chamber modules are preferably always used for only one material, and only those process chamber modules are used with the materials required at any given time. There will furthermore be process chamber modules in which the component is being cooled or powder is being preheated. It can thus be more favorable for only the radiating stations to be equipped with a controller for the application of powder in the process chamber module than for all process chamber modules to be thus equipped. The same applies in an analogous manner to controllers for other functions of the powder circuit/heaters, etc. In the case of very wide process chamber modules, in which a plurality of radiating modules are always required, it would however be more favorable for only the process chamber modules to be equipped with controllers for the process chamber module rather than for each radiating module to be thus equipped. It can also be advantageous for the controller to be embodied so as to be modular, and for the radiating modules or the process chamber modules to be equipped with controllers, depending on production.

A number of embodiments have been described. Nevertheless, it will be understood that various modifications may be made without departing from the spirit and scope of the invention. Accordingly, other embodiments are within the scope of the following claims.

What is claimed is:

1. A processing machine comprising:
 a process chamber module comprising:
  a process chamber defining a processing field,
  a construction platform,
  a powder coater configured, during operation of the processing machine, to apply a powder material layer-by-layer in a direction of the construction platform within the processing field, and
  a powder reservoir configured, during operation of the processing machine, to infeed the powder material to the powder coater; and
 a plurality of radiating modules, wherein each of the radiating modules is identical to each of the other radiating modules, and wherein each of the radiating modules comprises:
  a respective energy beam source configured, during operation of the processing machine, to generate an energy beam, and
  a respective optical deflector configured, during operation of the processing machine, to deflect the energy beam in a two-dimensional manner over the construction platform within a portion of the processing field,
 wherein the process chamber module is configured to releasably attach to the plurality of radiating modules,
 wherein the plurality of radiating modules are disposed in a row, and wherein each of the radiating modules is disposed against and releasably fixed to each of the other radiating modules to which it is adjacent in the row,
 wherein the portions of the processing field of two respective adjacent ones of the radiating modules partially overlap, and
 wherein during operation of the processing machine, the process chamber module is configured to receive power and water exclusively from the plurality of radiating modules.

2. The processing machine of claim 1, wherein a width of the construction platform is approximately equal to a collective width of the portions of processing field of the plurality of radiating modules.

3. The processing machine of claim 1, wherein at least one of the radiating modules is configured to operate as a master module, wherein at least another one of the radiating modules is configured to operate as a slave module, wherein the slave module is controlled by the master module.

4. The processing machine of claim 1, wherein each of the radiating modules comprises a respective optical sensor having a detection range, wherein the detection range of each of the optical sensors of the at least one of the radiating modules at least partially overlaps the portion of the processing field of another one of the radiating modules adjacent to the radiating module.

5. The processing machine of claim 1, wherein each of the radiating modules comprises a respective a controller interface configured to connect to a controller interface of another one of the radiating modules.

6. The processing machine of claim 1, wherein each of the radiating modules or the process chamber module comprises one or more reference structures indicating an attachment position of the process chamber module relative to the plurality of radiating modules.

7. The processing machine of claim 1, wherein the process chamber module is configured to connect, during operation, to one or more supply sources exclusively through at least one of the radiating modules.

8. The processing machine of claim 1, wherein each of the radiating modules comprises a respective controller, and wherein the process chamber module is connected to each of the controllers.

9. The processing machine of claim 1, wherein the process chamber module defines a process chamber window, wherein the process chamber window is configured, during operation of the processing machine, to receive at least one energy beam from the plurality of radiating modules.

10. The processing machine of claim 1, wherein the process chamber module and/or the plurality of the radiating modules are mounted on rollers or friction bearings.

11. The processing machine of claim 1, wherein the processing machine is a laser processing machine, wherein the energy beam sources of the plurality of radiating modules are lasers, and
wherein the optical deflectors of the plurality of radiating modules are arranged to deflect laser beams generated from the lasers with respect to two-dimensions.

12. The processing machine of claim 1, wherein the process chamber is gas-tight, and wherein the process chamber comprises a gas inlet and a gas outlet.

13. The processing machine of claim 1, wherein the process chamber module comprises:
at least one screen inclined at an angle in relation to a horizontal and arranged, during operation of the processing machine, to block at least a portion of the powder material, and
at least one collection container disposed below the at least one screen and configured, during operation of the processing machine, to collect at least a portion of the powder material not screened by the screen.

14. The processing machine of claim 13, wherein the at least one screen is mounted so as to be mechanically movable.

15. The processing machine of claim 14, further comprising a drive configured, during operation of the processing machine, to move the at least one screen according to an oscillating pattern.

16. The processing machine of claim 13, wherein the process chamber module comprises:
a self-contained powder circuit comprising the at least one screen, and
at least one conveying section configured, during operation of the processing device, to infeed the powder material that has been screened by the at least one screen into the powder reservoir.

17. The processing machine of claim 16, wherein the construction platform is configured to be separable in a gas-tight manner from other elements of the self-contained powder circuit.

18. The processing machine of claim 1, further comprising a detector configured, during operation of the processing machine, to detect a quantity of the powder material in the powder reservoir.

19. The processing machine of claim 1, further comprising a closable powder inlet configured, during operation of the processing machine, to infeed powder material in a metered manner into the powder reservoir.

20. The processing machine of claim 1, further comprising a plurality of process chamber modules,
wherein a width of each process chamber module is different than a width of each other process chamber module, and
wherein a width of each process chamber module is equal to a collective width of at least some of the radiating modules when the at least some of the radiating modules are disposed in a row.

21. A processing machine for producing components by a layer-by-layer construction from a material powder and by a layer-by-layer solidification of the material powder by means of a plurality of energy beams, comprising:
powder-conducting elements which comprise at least one process chamber having a construction platform and having a powder coater for the layer-by-layer application of a material powder to the construction platform, and a powder reservoir for the material powder to be infed to the powder coater,
a plurality of radiating modules, wherein each of the radiating modules is identical to each of the other radiating modules, and wherein each of the radiating modules comprises:
a respective energy beam source for generating a respective one of the energy beams, and
a respective optical deflectors for deflecting the respective one of the energy beams toward the material powder that is applied to the construction platform, in a two-dimensional manner over the construction platform,
wherein the processing machine is releasably assembled from a process chamber module comprising all of the powder-conducting elements of the processing machine and the radiating modules, such that the radiating modules are disposed in a row, and such that each of the radiating modules is disposed against and releasably fixed to each of the other radiating modules to which it is adjacent in the row
wherein the processing machine is releasably assembled from the process chamber module and the plurality of radiating modules, wherein the processing part-fields on the construction platform that are in each case covered by the energy beams of two adjacent ones of the radiating modules are partially mutually overlapping, and
wherein during operation of the processing machine, the process chamber module is configured to receive power and water exclusively from the plurality of radiating modules.

* * * * *